United States Patent Office 2,961,589
Patented Nov. 22, 1960

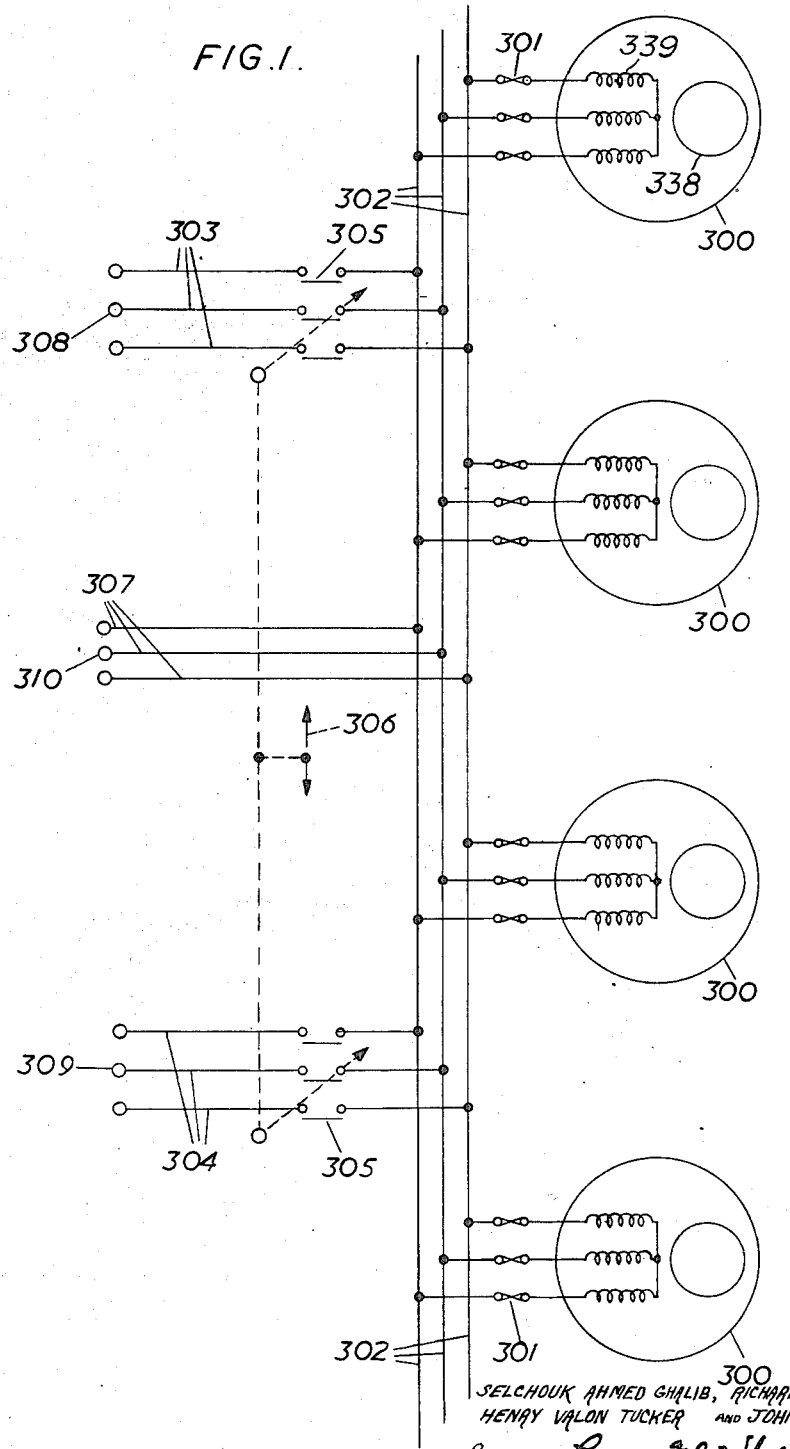

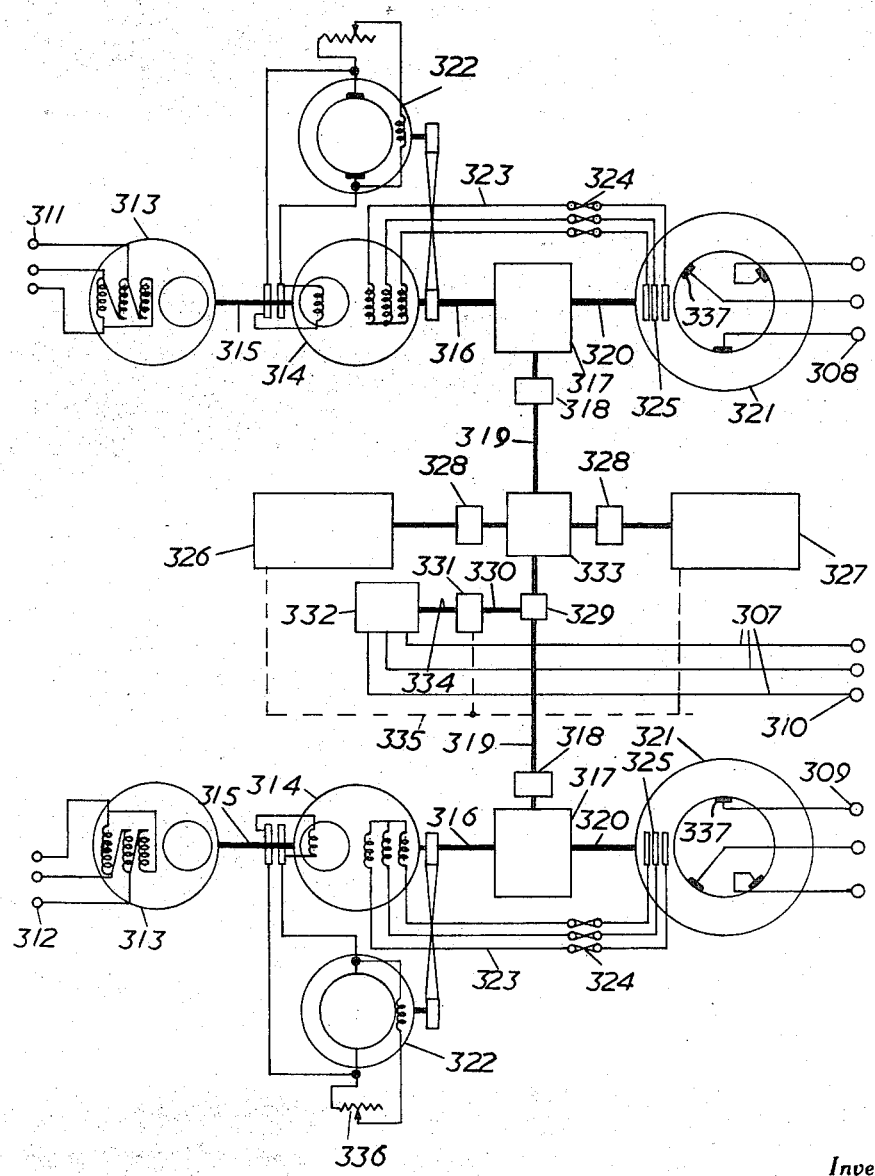

2,961,589

ELECTRICAL POSITION-FOLLOWER SYSTEMS

Selchouk Ahmed Ghalib, Sale, Richard Hope Kelsall, Cheadle, Henry Valon Tucker, Sale, and John Henry Bowen, Warrington, England; said Bowen assignor to United Kingdom Atomic Energy Authority, London, England Filed July 27, 1955, Ser. No. 524,716

4 Claims. (Cl. 318—171)

This invention relates to electrical position-follower systems and it provides an electrical system for remotely moving any desired number of machines in synchronism with the movement of a master control.

The invention is described below in relation to its principal application for controlling the reactivity of nuclear reactors.

The general requirement of nuclear reactor control apparatus is to move a reactivity modifying mass, usually in the form of a group of rods each with its own driving machine, into or out from a reactor core in a precisely controlled manner so as to provide stable operating control of the reactor at selected power levels and emergency control should abnormal conditions arise. In some reactor designs the dual function of operating control and emergency control are obtained from a single group of rods whilst in other designs the functions are each controlled by a separate group of rods.

Other requirements of nuclear reactor control include indication in a control room of the position of the control rods, low fault liability equipment and the minimum amount of apparatus in or near the reactor structure where faults may be introduced due to heat or irradiation, and where maintenance is hazardous, difficult, or inconvenient in that the reactor might have to be shut down for the maintenance to proceed.

Broadly, the electrical position follower system of the invention comprises follower machines position-sensitive to the relative combination of amplitudes of potentials on a group of feeders to which the machines are connected and a remote master control driving installation for cyclically varying the potentials on the feeders comprising rotary frequency converting means having its output taken to said feeders and its input connections taken to a polyphase supply, a differential device coupled so that its output drives the rotor of the frequency converting means and the first input of the differential device is driven from a motor adapted to rotate synchronously with said polyphase supply and a master control unit coupled to the second input of the differential device whereby cyclic variations obtained from the master control unit are followed by cyclic variations of the potentials on the feeders and hence followed by the follower machines.

In one form of the invention a synchronous motor is used to drive the first input of the differential device and it is arranged for the supply to this synchronous motor to be common with the polyphase supply at the input connections of the rotary frequency converting means.

In the form of the invention preferred for use in operating nuclear reactor control rods, the master control driving installation comprises a three-phase induction motor shaft coupled both to a three-phase alternator and to the first input of a differential gear into which a second input is provided by a shaft coupled with the master control unit. The electrical output of the alternator is taken to the three-phase windings of a commutator-type frequency convertor which is driven by the output shaft of the differential gear. Three output lines are taken from the converter and connected through circuit breakers to feeders, to which synchronous motors of the variable reluctance type are connected. A duplicate stand-by installation is provided which is driven from an emergency supply source.

In one application of the invention to the control of nuclear reactors, follower machines, each connected to drive a reactor control rod, are arranged to be position sensitive to a master control unit in the form of a handwheel for manual control and a motor driven shaft for automatic control. Where it is required that the control rods should serve the dual function of operating and emergency control the follower machines are designed to have a low inertia and to be readily disconnected electrically from their supply source so that the rods can fall quickly under gravity whilst driving the rotors of the follower machines.

The preferred form of the invention, generally described above, is now described in more detail with reference to the accompanying drawings which show circuit schematic diagrams; Fig. 1 is the diagram of the follower machines and Fig. 2 is the diagram of the master control driving installation.

Fig. 1 shows a series of variable reluctance type synchronous motors 300 having stators 339 and rotors 338 shown diagrammatically. The motors 300 are connected through fuses 301 to three feeders 302. The feeders are supplied by primary input lines 303 or stand-by lines 304 having contactors 305 operated by a control 306 represented diagrammatically. Reverse cut-off connections 307 are made from the feeders. The terminals 308, 309, 310 are connected with similarly numbered and located terminals in Fig. 2.

In Fig. 2 terminals 311 provide the electrical input to a primary master control driving installation and terminals 312 provide the input to a stand-by installation similar to the primary installation. Each installation has a main energised 3-phase induction motor 313 driving a 3-phase alternator 314 via a shaft 315. The shaft 315 is extended by part 316 to form one input to a differential gear 317. A second input to the differential gear is provided by a shaft 319 having a clutch 318. The output from the gear 317 is by way of a shaft 320 driving a frequency convertor 321. (A suitable converter is disclosed in "Elktrische Maschine," Band V, by Rudolf Richter, Springer Verlag, 1950, pages 511–513.)

The output from the convertor 321 is taken from the commutator 337 to terminals 308 (309 in the case of the stand-by installation). The alternator 314 is provided with an exciter 322 and the output of the alternator is taken by connections 323 and fuses 324 to the slip rings 325 of the convertor 321. Two master control units 326, 327 are provided which are connected as required via clutches 328 and gear drive 333 to the shafts 319. A gear drive 329 couples via a shaft 330, a rotary position switch 331 (i.e. a switch open in one angular position and closed in another) and a shaft 334 to a small variable reluctance synchronous motor 332 into which the connections 307 are taken. One side of the rotary position switch 331 is coupled with shaft 334 and the other side with shaft 330. Should the switch 331 be opened due to shafts 334 and 330 moving out of synchronism or by reversal of one shaft relative to the other (i.e. the motors 300 moving in a reverse sense to that fed into the system at the master control unit) an electrical connection 335 with control units 326, 327 is broken to operate a safety device in the control units which prevents any further rotation of shafts 319.

In the operation the system described above with reference to Figs. 1 and 2, the primary installation is driven by the motor 313 so as to feed an alternating current of any convenient frequency to the slip rings 325 of the convertor 321. So long as the shaft 319 does not rotate the shaft 320 is synchronous with the current to the convertor 321 and hence steady D.C. potentials are set up in the lines 303.

Depending upon the relative amplitudes of these potentials the rotors of the motors 300 remain at a certain angular position. When the shaft 319 is rotated the synchronism referred to above is upset and the potentials change smoothly to provide, in effect, continuously changing new combinations which are followed synchronously by the rotors of the motors 300. The angular positions of the shafts 319 are indicated and the approximate position of the control rods are indicated by an electrical transmission arrangement driven by movement of the control rod cables. The precise position of the control rods is determined, in conjunction with a calibration curve, from knowledge of the approximate position of the control rods and the angular position of shafts 319.

Should fault conditions arise, such that an immediate shut down of the reactor is required, the control 306 is operated which takes the power off the motors 300. The weight of the control rods then drives the motors 300 whilst the rods fall under gravity.

Change over arrangements between the primary set 311 and standby set 312 are conventional.

The position-follower system of the invention has the advantage that it functions substantially independently of frequency of the alternator 314 as the frequency of the alternator and speed of the shaft 316 are necessarily synchronous. Any change in main supply frequency at terminals 311 or changes in speed at start-up and close-down or changes in load, varies the absolute amplitudes of the potentials on the group of feeders by the same proportion but does not vary their sizes relative to each other nor does it alter the frequency at which they change, the frequency being solely dependent upon movement of the shaft 319. For example where one potential on one of the feeders 302 is stationary at 50 volts positive, a second potential is 25 volts negative and the third 25 volts negative all voltages can be increased by 10% to 55, 27.5 and 27.5 volts respectively without affecting the position of the follower motors. This frequency independent character is important where the invention is used to move control rods in nuclear reactors, for without it, main frequency changes and supply failures or short duration could cause the control rods to move unexpectedly and possibly in a dangerous manner. The motor driving the alternator need not be of the polyphase type. Where a D.C. supply source is used for emergency purposes the stand-by installation could be driven by a D.C. motor.

In the event of breakdown of the main supply to a master controller installation the inertia of the system is adequate to keep running whilst an emergency power source is switched into circuit. The reduced frequency during run-down does not affect control which is maintained as long as adequate potentials are available to operate the follower motors.

In one design of apparatus, similar to that described with reference to the drawings, it is arranged that the speed of the motors 300 can be varied between zero and forty rotations per minute. Forty motors 300 are provided each driving a cable drum supporting a control rod, the maximum controlled torque in each motor being of the order of 60 lbs./in. Greater speed variation can be obtained by arranging for suitable control of the voltage in connections 323 as the speed varies. This voltage control can be obtained at the exciter 322 which can be adjusted in conjunction with the speed setting of the master control units or manually by operation of rheostat 336 in the windings of exciter 322.

We claim:

1. A servomechanism of the self-synchronous type comprising a group of electrically synchronous polyphase machines connected to a polyphase feeder and a master controller for controlling the movements of said machines in synchronism with a control signal applied to said controller, wherein said controller comprises a differential gear having first and second input shafts and an output shaft, a polyphase motor electrically connected with a polyphase supply and mechanically connected with said first input shaft, control signal input means connected to said second input shaft, means deriving a polyphase supply in synchronism with said first input shaft, a polyphase rotary frequency converting machine mechanically connected with said output shaft, electrical connections from said derived polyphase supply to the electrical input of said frequency converting machine, and electrical connections from the output of said frequency converting machine to said polyphase feeder.

2. A servomechanism according to claim 1 wherein means are provided for disconnecting said synchronous machines from the output connections of said frequency converting machine.

3. A servomechanism according to claim 1 wherein the excitation of said derived polyphase supply means may be varied so that the control of the speed range of said synchronous machines is controlled according to said excitation.

4. A servomechanism according to claim 1 wherein said polyphase motor is an induction type motor.

References Cited in the file of this patent
UNITED STATES PATENTS 2,394,480 Read _____ Feb. 5, 1946
2,436,200 Choudhury et al. _____ Feb. 17, 1948